United States Patent [19]

Wu

[11] Patent Number: 5,092,286
[45] Date of Patent: Mar. 3, 1992

[54] INTAKE VENTING SYSTEM FOR REED VALVES

[75] Inventor: Ko-Jen Wu, Troy, Mich.

[73] Assignee: General Motors Corporation, Detroit, Mich.

[21] Appl. No.: 681,595

[22] Filed: Apr. 8, 1991

[51] Int. Cl.$^5$ .......................................... F02M 35/10
[52] U.S. Cl. ............................................. 123/52 MF
[58] Field of Search ...... 123/52 MF, 52 MB, 52 MC, 123/52 MV, 52 M

[56] References Cited

U.S. PATENT DOCUMENTS

| | | | |
|---|---|---|---|
| 3,810,454 | 5/1974 | Hunt | 123/587 |
| 3,937,194 | 2/1976 | Tamaki et al. | 123/119 A |
| 4,232,641 | 11/1980 | Curtil | 123/76 |
| 4,409,949 | 10/1983 | Tanaka et al. | 123/571 |
| 4,494,506 | 1/1985 | Hayama et al. | 123/348 |
| 4,512,152 | 4/1985 | Asaba | 60/601 |
| 4,517,947 | 5/1985 | Nishikawa et al. | 123/489 |
| 4,760,703 | 8/1988 | Minami et al. | 60/605.1 |
| 4,773,358 | 9/1988 | Heath | 123/58 R |
| 4,890,582 | 1/1990 | Schatz et al. | 123/26 |
| 4,928,639 | 5/1990 | Schatz | 123/52 MF |
| 4,932,378 | 6/1990 | Hitomi et al. | 123/432 |
| 4,986,225 | 1/1991 | Wu et al. | 123/52 MF |
| 4,991,547 | 2/1991 | Davis et al. | 123/52 MF |
| 5,009,199 | 4/1991 | MacFarlane | 123/52 MF |

FOREIGN PATENT DOCUMENTS

| | | | |
|---|---|---|---|
| 271130 | 6/1988 | European Pat. Off. | |
| 344780 | 12/1989 | European Pat. Off. | |
| 164773 | 5/1989 | India | |
| 0062925 | 4/1982 | Japan | 123/52 M |
| 0008230 | 1/1983 | Japan | 123/52 M |
| 58-210322 | 3/1984 | Japan | |
| 0026365 | 2/1987 | Japan | 123/52 M |
| 63-094027 | 9/1988 | Japan | |
| 0224421 | 9/1989 | Japan | 123/52 M |
| 0889878 | 12/1981 | U.S.S.R. | |
| 2136501 | 9/1984 | United Kingdom | |
| 2215817 | 6/1989 | United Kingdom | |

OTHER PUBLICATIONS

"A Stratified Charging Two-Stroke Engine for Reduction of Scavenged-Through Losses", SAE Technical Paper Series 891805, Sep. 11-13, 1989.

"Reduction of Fresh Charge Losses by Selective Exhaust Gas Recirculation (SEGR) in Two-Stroke Engines", SAE Technical Paper Series 891806, Sep. 11-13, 1989.

*Primary Examiner*—David A. Okonsky
*Attorney, Agent, or Firm*—Gordon F. Belcher

[57] ABSTRACT

An intake venting system comprising a plurality of intake passages. Each of the intake passages leads to a respective cylinder in an engine. A reed valve is disposed in and attached to each intake passage. Each of the reed valves allows fluid flow toward the respective cylinder and obstructs fluid back-flow in the reverse direction. An intake valve is seated in each of the intake passages between the reed valve therein and the cylinder to which the respective intake passage leads. A bypass port is located on each intake passage so that each bypass port communicates with a trapped volume defined by the portion of the intake passage between the reed valve and intake valve therein. A control valve is connected to each of the bypass ports, with the control valve enabling communication between a predetermined pair of the trapped volumes during a portion of the engine cycle when the pressure in one of the pair of trapped volumes exceeds the pressure immediately upstream thereof, and the pressure in the other of the pair of trapped volumes is less than the pressure in the one of the pair of trapped volumes.

7 Claims, 4 Drawing Sheets

| CYLINDER | | | |
|---|---|---|---|
| 12a | 12b | 12c | 12d |
| COMPRESSION | EXPANSION | INTAKE | EXHAUST |
| EXPANSION | EXHAUST | COMPRESSION | INTAKE |
| EXHAUST | INTAKE | EXPANSION | COMPRESSION |
| INTAKE | COMPRESSION | EXHAUST | EXPANSION |

TIME ↓

INTAKE VENTING SYSTEM FOR REED VALVES

TECHNICAL FIELD

This invention relates to an intake venting system for reed valves located in the intake passages leading to the cylinders of an engine, the intake venting system including a control valve means enabling communication between predetermined pairs of the intake passages downstream of the reed valves to vent these portions of the intake passages.

BACKGROUND

A reed valve typically includes a cage which is located in a flow passage so that the cage spans the cross section of the passage. The cage has several cage ports allowing fluid flow therethrough. A petal consisting of a flat, flexible member is pivotably connected to the downstream side of the cage adjacent each cage port so that the petal covers the cage port. A stop, which may comprise a plate, can be attached to the cage to limit the deflection of the petal away from the cage.

Fluid having sufficiently high pressure upstream of the cage causes the petal to begin to deflect away from the cage allowing fluid flow through the cage port thereby opening the reed valve. After the petal deflection is initiated, the petal oscillates between the cage and the stop. The duration of the opening of the reed valve (i.e., the petal being deflected away from the cage) is believed to be dependent on the petal structure and engine operating conditions.

When the pressure of the fluid upstream of the cage becomes less than the pressure downstream of the cage, the petal will return to the cage thereby obstructing the cage port and closing the reed valve. In this position, the petal obstructs fluid back-flow from downstream of the cage through the cage port.

When a reed valve is located in an intake passage leading to a cylinder of an engine, a trapped volume is defined by the portion of the intake passage between the reed valve and an intake valve seated in the intake passage between the reed valve and cylinder. Such an arrangement can be used in conjunction with an intake valve which remains open after the intake phase of the engine cycle and during the initial part of the compression phase of the engine cycle. Opening of the intake valve during the compression phase allows additional fluid to flow into the cylinder at some engine operating conditions, but can also result in fluid flowing out of the cylinder back into the trapped volume at other engine operating conditions. The reed valve obstructs such fluid back-flow further into the intake passage resulting in improved engine performance as compared to an engine employing the same intake valve timing without a reed valve.

The improvements in engine performance resulting from the use of a reed valve with such an intake valve can be limited if certain reed petal structures are used and the engine is operated at certain speeds. These limitations in engine performance are believed to be due, in part, to the petal structure. A specific petal structure can result in acceptable durations of petal deflection for most engine operating speeds, yet remain deflected away from the cage during some engine operating speeds after the fluid flow toward the cylinder has ceased and the fluid back-flow out of the cylinder has begun. Such a condition can result in a significant reduction in the ability of the reed valve to obstruct fluid back-flow. Since the petal structure is fixed in a typical reed valve, it can be difficult to select a petal structure which does not remain deflected away from the cage after the intake phase, during at least some of the broad range of engine operating speeds.

A delay in the opening of the reed valve with respect to the beginning of the intake phase can occur during some engine operating speeds and is believed to also contribute to deflection of the petal after the fluid flow toward the cylinder has ceased during such engine operating speeds. This is due to the petal deflection duration being primarily dependent upon the petal structure and engine operating speed. Thus, a delay in the opening of the reed valve can cause a consequent delay in the closing of the reed valve.

A delay in the opening of the reed valve can be caused by the trapped volume having a pressure substantially higher than the pressure upstream of the reed valve. Such an elevated pressure in the trapped volume can be caused by the intake valve remaining open during the initial part of the compression phase in the cylinder. Such an elevated pressure in the trapped volume must be reduced so that it is less than the pressure upstream of the petal in order for the petal to begin to deflect away from the cage. Ordinarily, the increased pressure in the trapped volume is maintained until the intake phase begins when the increased pressure is vented to the cylinder. The time required for the pressure reduction can cause the delay in the reed valve opening.

SUMMARY OF THE INVENTION

The present invention provides an intake venting system comprising a plurality of intake passages. Each of the intake passages leads to a respective cylinder in an engine. A reed valve is disposed in and attached to each intake passage. Each of the reed valves allows fluid flow toward the respective cylinder and obstructs fluid back-flow in the reverse direction. An intake valve is seated in each of the intake passages between the reed valve therein and the cylinder to which the respective intake passage leads. A bypass port is located on each intake passage so that each bypass port communicates with a trapped volume defined by the portion of the intake passage between the reed valve and intake valve therein.

A control valve means is connected to each bypass port. The control valve means enables communication between a predetermined pair of the trapped volumes during a portion of the engine cycle when the pressure in one of the pair of trapped volumes exceeds the pressure immediately upstream thereof, and the pressure in the other of the pair of trapped volumes is less than the pressure in the one of the pair of trapped volumes.

The communication between the one of the pair of trapped volumes, when the pressure therein exceeds the pressure immediately upstream thereof, and the other of the pair of trapped volumes having a pressure lower than the one of the pair of trapped volumes results in venting of the elevated pressure in the one of the pair of trapped volumes. This allows the pressure in the one of the pair of trapped volumes to drop to a level approximately equal to the pressure upstream of the reed valve prior to the start of the fluid flow into the adjoining cylinder. The reed valve adjoining the one of the pair of trapped volumes can thereby open earlier with respect to the start of the fluid flow into the adjoining cylinder.

The earlier opening of the reed valve can result in an earlier closing of the reed valve, with respect to the cessation of the fluid flow into the cylinder. This is due to the duration of the petal deflection away from the cage being primarily dependent upon the petal structure and engine operating speed. The earlier closing of the reed valve can reduce the duration of any period during which the fluid flow toward the cylinder has ceased but the petal remains deflected away from the cage. This reduces the likelihood of the reed valve remaining open during periods of fluid back-flow.

These and other features and advantages of the invention will be more fully understood from the following description of certain specific embodiments of the invention taken together with the accompanying drawings.

BRIEF DRAWING DESCRIPTION

In the drawing.

Corresponding reference characters indicate corresponding parts throughout the several views of the drawings.

DETAILED DESCRIPTION

Figure 1:
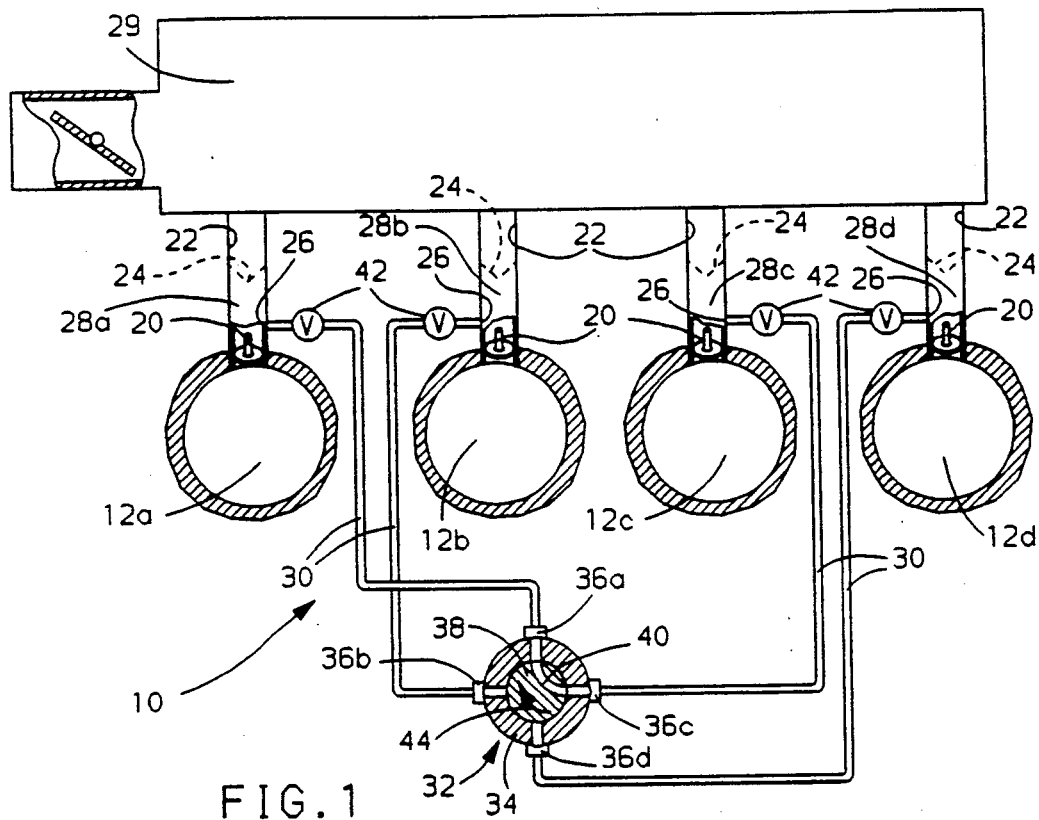
FIG. 1 is a schematic view showing the intake venting system of the present invention connected to a four cylinder engine.

Referring to the drawings, and in particular FIG. 1, numeral 10 generally refers to an intake venting system of the present invention connected to an engine having four cylinders 12a-d. The intake venting system 10 may also be used with an engine having a different number of cylinders.

The intake venting system 10 comprises an intake passage 22 leading to a respective cylinder 12a-d in the engine. A plenum 29 is connected to the inlet of each intake passage 22.

A reed valve 24 is disposed in and attached to each of the intake passages 22 to allow fluid flow toward the cylinders 12a-d and obstruct fluid back-flow in the reverse direction. An intake valve 20 is seated in each intake passage 22 between the respective reed valve 24 and cylinder 12a-d. While FIG. 1 shows a single intake valve 20 for each cylinder 12a-d, it is possible to use the intake venting system 10 with an engine having multiple intake valves for each cylinder. A bypass port 26 is located on each of the intake passages 22 so that each of the bypass ports communicates with a respective trapped volume 28a-d defined by the portion of the intake passage between the reed valve 24 and intake valve 20 therein.

The intake bypass system 10 includes a control valve means, comprising a rotary valve 32, having a rotor housing 34 with a plurality of rotor ports 36a-d located adjacent one another and equally spaced along the perimeter of the rotor housing. The rotary valve 32 includes a plurality of secondary passages 30, with each secondary passage extending from a respective rotor port 36a-d. Each secondary passage 30 extends to a respective bypass port 26 enabling each rotor port 36a-d to communicate with a respective trapped volume 28a-d. It is possible to have a plurality of rotary valves 32.

The rotary valve 32 further includes a rotor 38 within the rotor housing 34. The rotor 38 includes a rotor passage 40 having an elbow shape. The rotor 38 is adapted to rotate in the direction indicated by arrow 44 to enable the rotor passage to simultaneously register with adjacent pairs of the rotor ports, e.g., 36a, 36c. The rotary valve 32 thereby enables communication, via the secondary passages 30, between predetermined pairs of the trapped volumes, e.g., 28a, 28c.

A secondary control valve 42 is connected to each secondary passage 30 to enable adjustment of the flow area of each secondary passage to regulate flow therethrough. The secondary control valves 42 can also enable complete closure of the secondary passages 30. Each secondary control valve 42 may comprise a solenoid valve.

Figure 2:
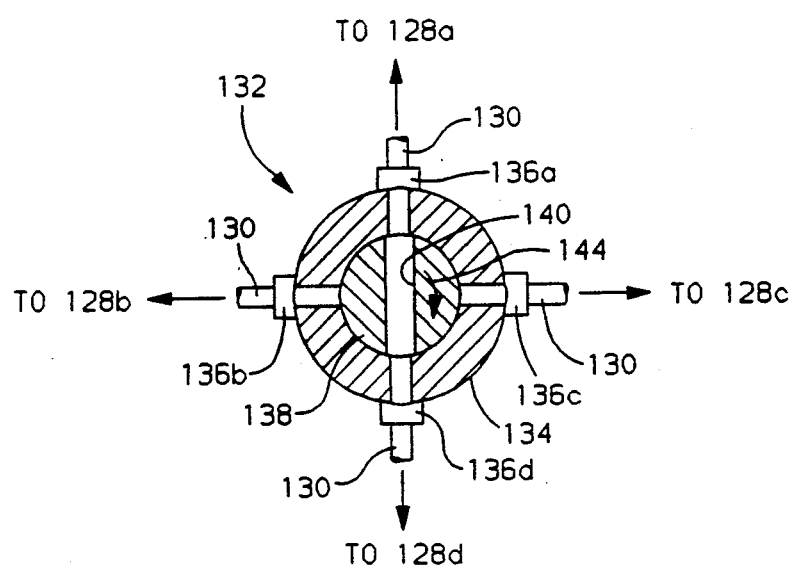
FIG. 2 is a schematic view of a second embodiment of the rotary valve of FIG. 1.

A second embodiment of the rotary valve 132 is shown in FIG. 2. Parts similar to those shown in FIG. 1 have the same reference numeral with the addition of the prefix 100. In this embodiment, the rotor passage 140 is straight enabling it to simultaneously register with rotor ports, e.g., 136a, 136d, which are diametrically opposed to one another.

Figures 3, 4:
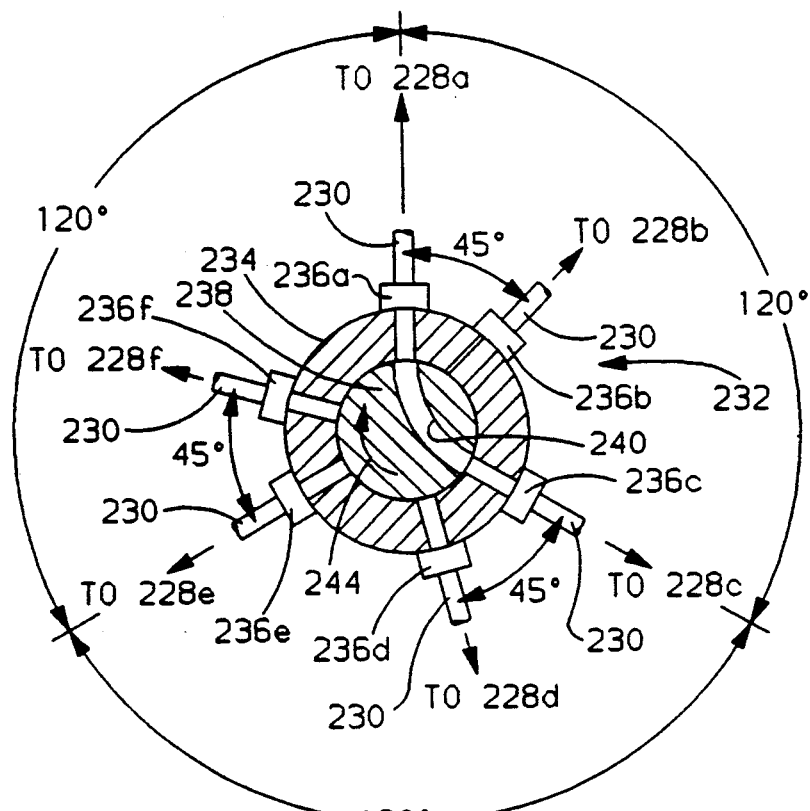
FIG. 3 is a schematic view of a rotary valve of the present invention for use with a six cylinder engine.
FIG. 4 is a chart showing the firing order of the cylinders of FIG. 1.

An embodiment of the rotary valve 232 for use with a six cylinder engine is shown in FIG. 3. Parts similar to those shown in FIG. 1 have the same reference numeral with the addition of the prefix 200. In this embodiment, the rotor housing 234 has six rotor ports 236a-f. The circumferential distance between pairs of adjacent rotor ports 236a-f alternates around the circumference of the rotor housing 234, as shown in FIG. 3. The rotor passage 240 has the shape of an elbow and is sufficiently curved to enable it to simultaneously register with pairs of rotor ports, e.g., 236a, 236c, which have a third port, e.g., 236b, disposed between them. Thus, even though the spacing between all of the pairs of adjacent rotor ports 236a-f is not equal, the rotor passage 240 which has a fixed curvature is able to provide communication between predetermined pairs of rotor ports, e.g., 236a, 236c.

Operation

The operation of the intake venting system 10 is illustrated as used with a four-stroke engine cycle. The four-stroke engine cycle, as shown in FIG. 4, comprises, for each cylinder 12a-d, (i) an intake phase during which a piston in the cylinder translates from top-dead-center (TDC) to bottom-dead-center (BDC) enabling air to flow from the trapped volume into the cylinder, (ii) a compression phase during which the piston translates from BDC to TDC thereby compressing the gas in the cylinder, and during which the gas in the cylinder is normally ignited, (iii) an expansion phase during which the gas in the cylinder expands thereby releasing energy causing the piston to translate from TDC to BDC and generate power, and (iv) an exhaust phase during which the piston translates from BDC to TDC enabling exhaust gas to flow out of the cylinder.

The firing order of the cylinders shown in FIG. 1 is 12a, 12c, 12d and 12b, as shown in FIG. 4. The cylinders are fired every 180 degrees of crankshaft rotation.

Each intake valve 20 is connected to a valve controller, such as a camshaft, which causes the intake valve to remain open during the initial part of the compression phase in the adjoining cylinder 12a–d. This results in fluid back-flow from each cylinder, e.g., 12a, flowing into the adjoining trapped volume, e.g., 28a, causing the pressure therein to increase.

The order in which the trapped volumes 28a–d are connected to each rotor port is 36a, 36c, 36d, and 36b. The rotor ports 36a–d are spaced around the rotor housing 34 so that the angular separation between the rotor ports is equal to one half of the angular rotation of the crankshaft between firings of the cylinders 12a–d. Thus, the angular separation between the rotor ports 36a–d is 90 degrees.

The angular velocity of the rotor 38 is one-half of the angular velocity of the crankshaft. Each cylinder therefore undergoes each phase of the engine cycle during one revolution of the rotor 38. The rotation of the rotor 38 is timed with respect to the engine cycle so that the rotor passage 40 registers with each rotor port 36a–d when it is connected to a trapped volume 28a–d having a pressure which exceeds the pressure immediately upstream thereof. The elevated pressure in each trapped volume, e.g., 28a, is due to the fluid back-flow from the adjacent cylinder, e.g., 12a, during the initial part of the compression phase therein when the intake valve 20 is open. The pressure immediately upstream of the trapped volumes 28a–d is approximately equal to the pressure in the plenum 29.

The registry of the rotor passage 40 with the rotor ports, e.g., 36a, connected to a trapped volume, e.g., 28a, having an elevated pressure, preferably occurs after the adjoining intake valve 20 closes, and when the adjoining cylinder, e.g., 12a, is undergoing a compression phase. The communication between the rotor passage 40 and the rotor port, e.g., 36a, after the adjoining intake valve 20 closes facilitates containment of the fluid back-flow from the cylinder, e.g., 12a, into the trapped volume, e.g., 28a. Also, it enables the elevated pressure to be reduced prior to the next opening of the intake valve 20.

The rotation of the rotor 38 is timed and the rotor passage 40 is shaped so that, when the rotor passage 40 registers with a rotor port, e.g., 36a, leading to a trapped volume, e.g., 28a, having an elevated pressure, the rotor passage also registers with a rotor port, e.g., 36c, leading to a trapped volume, e.g., 28c, through which fluid is flowing to an adjoining cylinder, e.g., 12c (i.e., a cylinder undergoing an intake phase), as shown in FIG. 4. The trapped volume, e.g., 28c, adjoining the cylinder, e.g., 12c, undergoing an intake phase has a reduced pressure since fluid is being drawn through the trapped volume, e.g., 28c, into the adjoining cylinder, e.g., 12c. Communication between the respective pairs of trapped volumes, e.g., 28a, 28c, thereby results in venting of the trapped volumes, e.g., 28a, having the elevated pressure. Also, the fluid vented from the trapped volumes, e.g., 28a, returns to the engine via the secondary passages 30 and the trapped volume, e.g., 28c, having the reduced pressure to provide supplemental fluid to each cylinder, e.g., 12c.

The rotor 38 can be rotatably coupled to the camshaft of the engine so that the angular velocity of the rotor is one half of the angular velocity of the crankshaft. This enables each trapped volume, e.g., 28a, to be automatically vented once during each engine cycle in the adjoining cylinder, e.g., 12a.

Each trapped volume, e.g., 28a, is preferably vented so that the pressure therein drops to a pressure approximately equal to the pressure immediately upstream of the adjoining reed valve 24 prior to the intake phase in the adjoining cylinder, e.g., 12a. This can result in each reed valve 24 opening shortly after the beginning of the intake phase in the adjoining cylinder, e.g., 12a, since the pressure reduction in the trapped volume, e.g., 28a, required to cause the reed valve 24 to open is lessened. Since the part of the engine cycle during which the reed valve 24 closes depends upon the part of the engine cycle during which it opens, delay in the closing of the reed valve 24 is reduced. The likelihood of the reed valve 24 being open during periods of fluid back-flow is thereby reduced.

It is possible to vent the trapped volumes, e.g., 28a, during phases of the engine cycle, other than the compression phase, as long as the intake valve 20 adjoining the trapped volume, e.g., 28a, which is being vented, is closed. Changing the phase of the engine cycle during which the trapped volumes 128a–d are vented can be accomplished by using the rotary valve 132 shown in FIG. 2.

The rotary valve 132 enables communication between predetermined pairs of trapped volumes, e.g., 128a, 128d in a similar fashion as the rotary valve 32 shown in FIG. 1. The order in which the trapped volumes 128a–d are connected to the rotor ports 136a–d is the same as for the rotary valve 32 shown in FIG. 1. Because, however, of the straight shape of the rotor passage 140 shown in FIG. 2, each trapped volume, e.g., 128a, is vented when the adjoining cylinder 112a is undergoing an expansion phase, as shown in FIG. 4.

Figure 5:
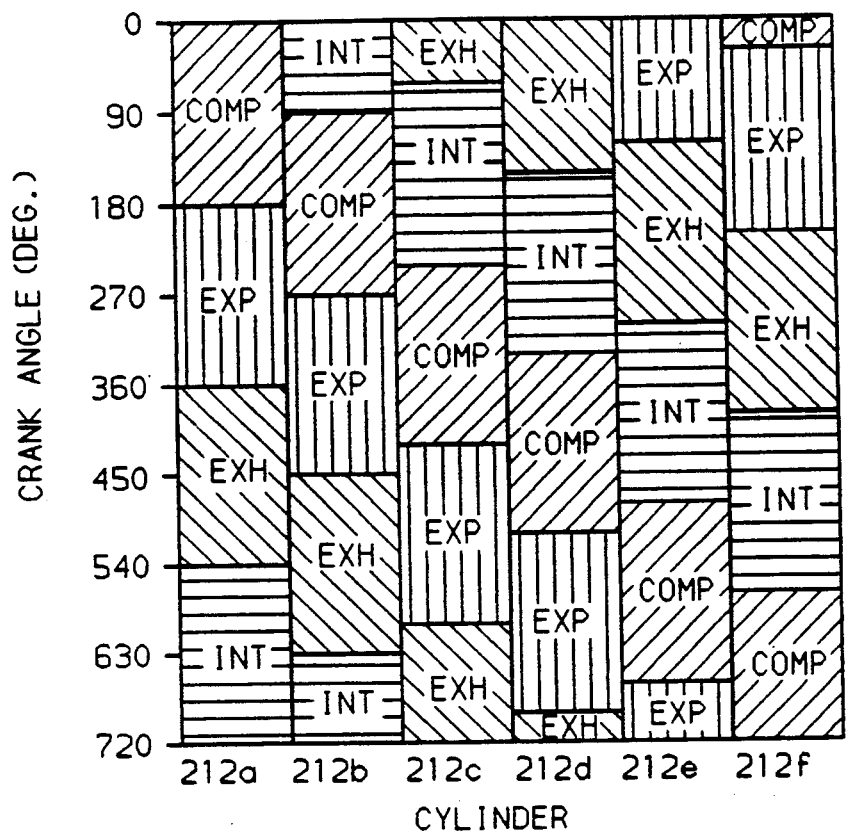
FIG. 5 is a chart showing the firing order of the cylinders of an engine with which the rotary valve of FIG. 3 can be used.

The rotary valve 232 shown in FIG. 3 can be used with a six cylinder engine operated according to a four-stroke engine cycle. The firing order of the cylinders is 212a, 212b, 212c, 212d, 212e and 212f, as shown in FIG. 5. The intervals between the firings of the cylinders 212a–f alternate between 90 and 150 degrees of crankshaft rotation.

The order in which the trapped volumes 228a–f are connected to each rotor port 236a–f, as shown in FIG. 3, corresponds to the firing order of the cylinders 212a–f. The rotor ports 236a–f are spaced around the rotor housing 234 so that the angular separation between the rotor ports is equal to one half of the angular rotation of the crankshaft between firings of the cylinders 212a–f connected to the respective rotor ports. For example, the crankshaft rotates 90 degrees between firings of cylinders 212a and 212b. Therefore, the angular separation between the rotor ports 236a and 236b is 45 degrees.

The rotor 238 rotates at one-half the speed of the crankshaft. Each cylinder 212a–f therefore fires once during one revolution of the rotor. The rotation of the rotor 238 is timed with respect to the engine cycle so that the rotor passage 240 registers with each rotor port 236a–f when it is connected to a trapped volume 228a–f having a pressure which exceeds the pressure immediately upstream thereof.

The rotation of the rotor 238 is timed with respect to the engine cycle so that the rotor passage 240 communicates with a trapped volume, e.g., 228a, having an elevated pressure after the adjoining intake valve 220 closes and when the adjoining cylinder, e.g., 212a, is undergoing the end of a compression phase and the beginning of an expansion phase. During this portion of the engine cycle, the trapped volume, e.g., 228a, having the elevated pressure is vented, via the rotor passage 240, to a trapped volume, e.g., 228c, through which fluid is flowing to the adjoining cylinder 212c, as shown in FIG. 5.

Each trapped volume, e.g. 228c, having an elevated pressure can also be vented when the adjoining cylinder, e.g., 212c, is undergoing the end of an expansion phase and the beginning of an exhaust phase. In order to vent each trapped volume, e.g., 228c, during this portion of the engine cycle, the timing of the rotor passage 240 with respect to the engine cycle must be altered so that the rotor passage registers with each trapped volume, e.g., 228c, during these phases of the engine cycle. The shape of the rotor passage 240 can remain the same. With this timing, each trapped volume, e.g., 228c, having an elevated pressure is vented, via the rotor passage 240, to a trapped volume, e.g., 228a, through which fluid is flowing to the adjoining cylinder 212a.

Figure 6:
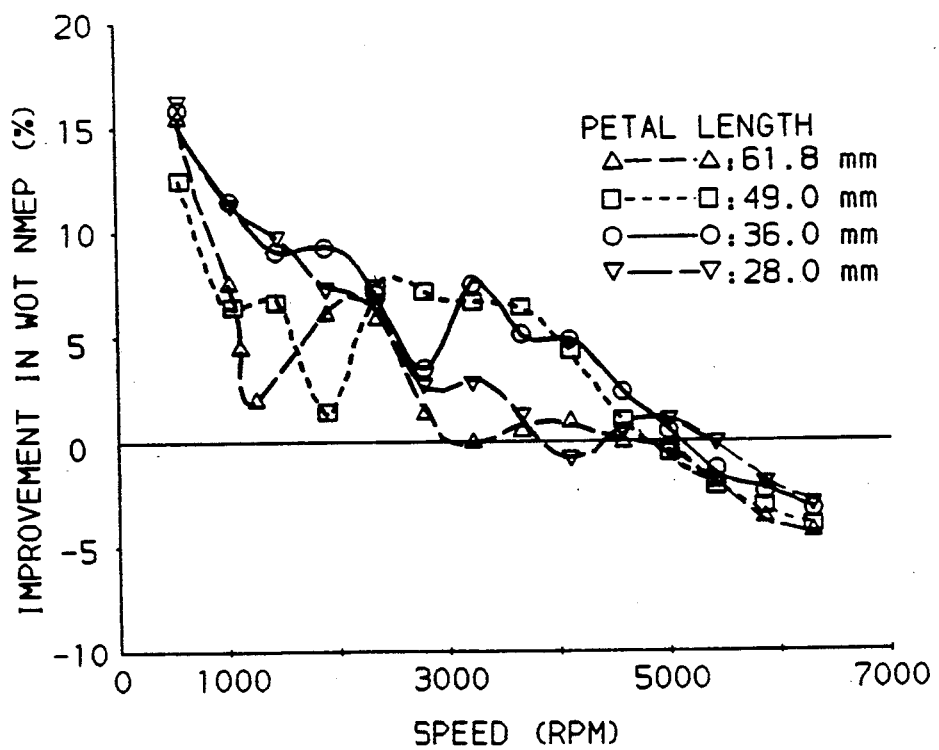
FIG. 6 is a graph showing the improvement in the performance of similar engines having reed valves with different petal lengths, as compared to a similar engine lacking a reed valve.
Figure 7:
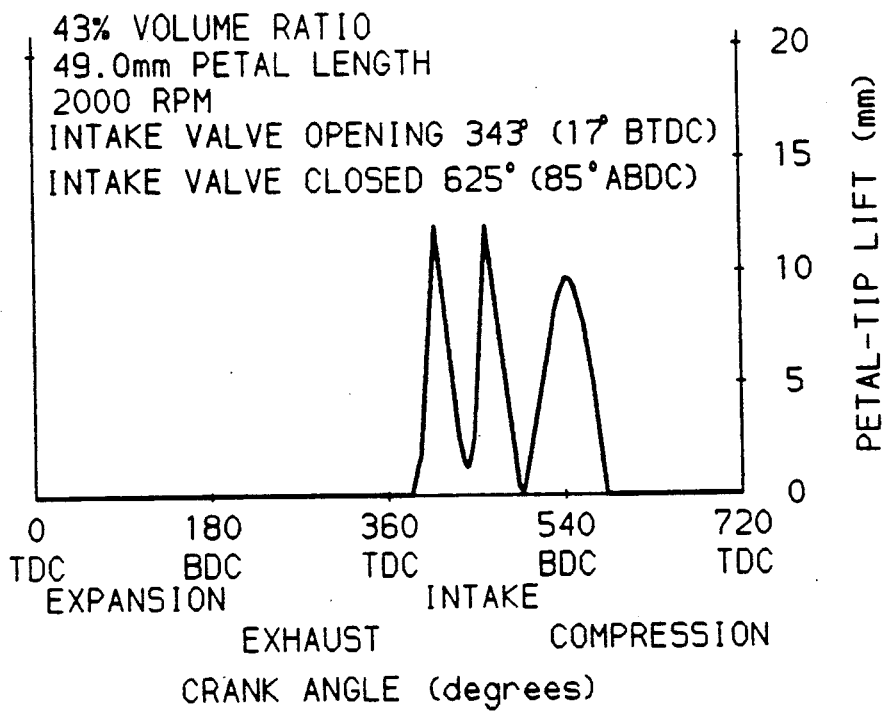
FIG. 7 is a graph showing the petal-tip lift for one of the reed valves of FIG. 6 during the engine cycle.
Figure 8:
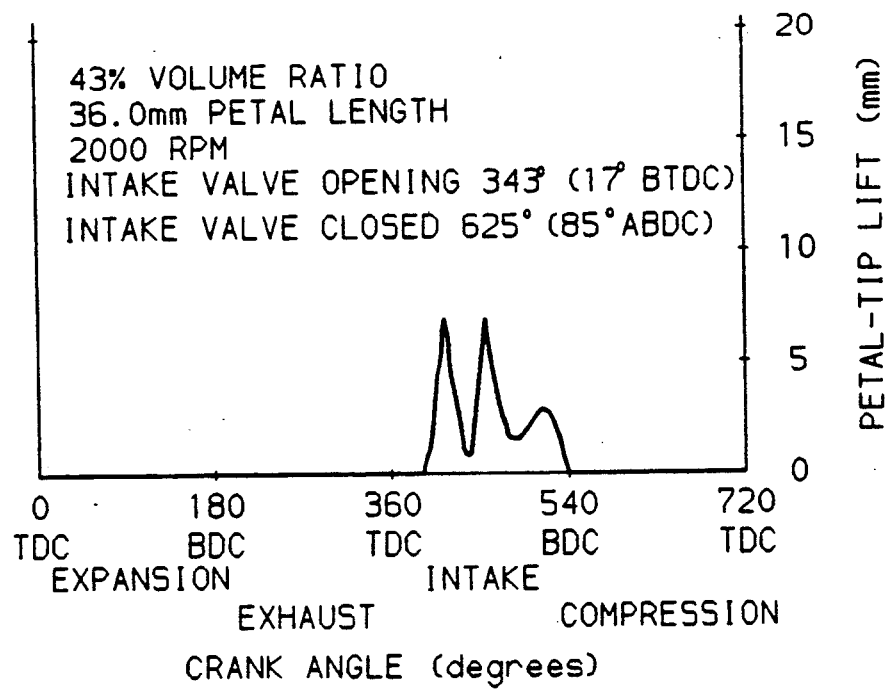
FIG. 8 is a graph showing the petal-tip lift for another one of the reed valves of FIG. 6 during the engine cycle.

FIGS. 6, 7 and 8 contain graphs which illustrate the effect that the structure of a reed valve, such as the reed valve 24 shown in FIG. 1, is believed to have on engine operation. The reed valve structure is defined, in part, by the length of the petal in the reed valve. FIG. 6 shows graphs which were derived from calculated values obtained from an analytical model of an engine having a reed valve (such as the reed valve 24) in an intake passage (such as the intake passage 22) upstream of a cylinder (such as the cylinders 12a-d), but lacking the intake venting system 10.

FIG. 6 shows the improvement in performance of similar engines having reed valves, as compared to a similar engine lacking a reed valve, over a range of engine operating speeds. The length of the petal in each reed valve was different with each curve corresponding to a specific petal length. Wide open throttle (WOT) net mean effective pressure (NMEP) was used as the indicia of engine performance. The variations in engine performance are believed to be due to the ability of the reed valve 24 to obstruct fluid back-flow during different engine operating speeds.

FIGS. 7 and 8 show the lift of the petal tip of the reed valve over a complete engine cycle for two of the petal lengths shown in FIG. 6. The graphs in FIGS. 7 and 8 were derived from calculated values obtained from the analytical model used to derive the graphs of FIG. 6. For FIGS. 7 and 8, the volume ratios, i.e., the ratio of the trapped volume to the piston swept volume of the corresponding cylinder, and the engine operating speeds were the same.

In both FIGS. 7 and 8, the intake valve opens at 343 degrees, i.e., 17 degrees before top-dead-center (BTDC) of the piston in the cylinder. The intake valve closes at 625 degrees, i.e., 85 degrees after bottom-dead-center (ABDC) of the piston in the cylinder. The closure of the intake valve after the intake phase results in fluid back-flow from the cylinder past the open intake valve into the trapped volume since the intake valve is open during the initial part of the compression phase. The resistance to the fluid back-flow provided by the inertia of the fluid flow through the reed valve into the trapped volume is minimal due to the low engine operating speed.

The reed valve of FIG. 7 closes during the compression phase. Since fluid back-flow into the intake passage begins shortly after the start of the compression phase, the reed valve of FIG. 7 is open during a period when there is fluid back-flow into the intake passage. The ability of the reed valve of FIG. 7 to obstruct fluid back-flow is therefore limited. The reed valve of FIG. 8, however, is closed at the start of the compression phase and is thus able to obstruct fluid back-flow further into the intake passage. The reed valve of FIG. 8 can therefore be expected to enhance engine performance to a greater extent than the reed valve of FIG. 7. This is consistent with a comparison of the graphs of FIG. 6 corresponding to the petal lengths and engine operating speeds of FIGS. 7 and 8.

Using the intake venting system 10 with the reed valve of FIG. 7 can reduce the duration of the opening of the reed valve during the initial part of the compression phase when the intake valve is open. Such delayed closing of the reed valve can occur during some engine operating speeds. Reducing the delay in the closing of the reed valve enhances the obstruction to fluid back-flow provided by the reed valve thereby improving engine performance.

The graphs in FIG. 6 indicate that the reduced engine performance caused by the delayed closing of the reed valve, as illustrated by FIG. 7, may not be significant during some engine operating speeds. For example, the reed valve of FIG. 8 closes before the compression phase. Thus, the improvements resulting from use of the intake venting system 10 may be limited during some engine operating speeds. It therefore may be desirable to partially or completely deactivate the intake venting system 10 during some engine operating speeds. This can be accomplished by partially or completely closing the secondary control valves 42.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An intake venting system comprising:
    a plurality of intake passages, each of said intake passages leading to a respective cylinder in an engine;
    a plurality of reed valves, each of said reed valves being disposed in and attached to a respective one of said intake passages, each of said reed valves allowing fluid flow toward the respective cylinder and obstructing fluid back-flow in the reverse direction;
    a plurality of intake valves, each of said intake valves being seated in a respective one of said intake passages between said reed valve therein and the cylinder to which the respective one of said intake passages leads;
    a plurality of bypass ports, each of said bypass ports being located on a respective one of said intake passages so that each of said bypass ports communicates with a respective trapped volume defined by the portion of said intake passage between said reed valve and intake valve therein; and a control valve means connected to each of said bypass ports, said control valve means enabling communication between a predetermined pair of said trapped volumes during a portion of the engine cycle when the pressure in one of said pair of trapped volumes exceeds the pressure immediately upstream thereof, and the pressure in the other of said pair of trapped volumes is less than the pressure in said one of said pair of trapped volumes.

2. An intake venting system as set forth in claim 1 wherein said control valve means comprises a rotary valve including a rotor housing having a plurality of rotor ports, each of said bypass ports being connected to one of said rotor ports to enable communication between each of said rotor ports and a respective one of said trapped volumes, said rotary valve further including a rotor within said rotor housing, said rotor having a rotor passage, said rotor being adapted to rotate to enable said rotor passage to register with respective pairs of said rotor ports to enable said communication between said predetermined pair of trapped volumes.

3. An intake venting system as set forth in claim 2 wherein each cylinder undergoes an intake, compression, expansion and exhaust phase during a complete rotation of said rotor.

4. An intake venting system as set forth in claim 1 wherein said control valve means includes a plurality of secondary passages extending therefrom, each of said secondary passages extending to a respective bypass port to enable communication between said control valve means and trapped volumes, said control valve means further including a secondary control valve connected to each of said secondary passages to enable adjustment of the flow areas of said secondary passages.

5. An intake venting system as set forth in claim 1 wherein said intake valve adjoining said one of said pair of trapped volumes is open during the initial part of a compression phase in the adjoining cylinder so that a portion of the fluid therein flows back into said one of said pair of trapped volumes to produce said pressure therein in excess of said pressure immediately upstream thereof.

6. An intake venting system as set forth in claim 5 wherein said communication between said predetermined pair of trapped volumes occurs when said intake valve, adjoining said one of said pair of trapped volumes, is closed.

7. An intake venting system as set forth in claim 1 wherein said communication between said predetermined pair of trapped volumes occurs when said other of said pair of trapped volumes has fluid therein flowing into the cylinder downstream of said other of said pair of trapped volumes.

* * * * *